March 1, 1932.  E. KOWER ET AL  1,847,114
AUTOMOBILE AUXILIARY CONTROL STRUCTURE
Original Filed Sept. 12, 1928   3 Sheets-Sheet 1
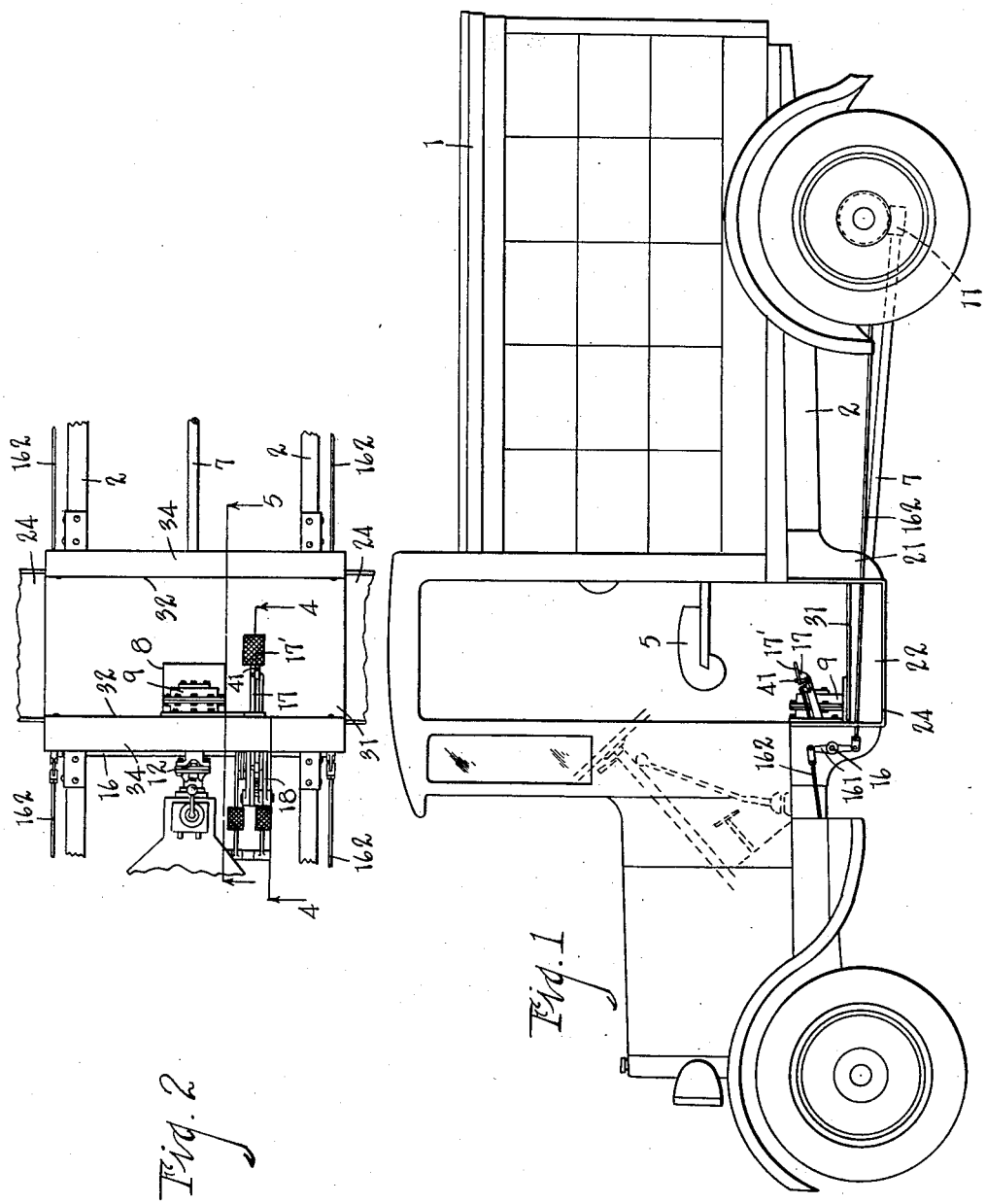
INVENTORS
Eugene Kower
William L. Cummings
BY
ATTORNEYS March 1, 1932.  E. KOWER ET AL  1,847,114
AUTOMOBILE AUXILIARY CONTROL STRUCTURE
Original Filed Sept. 12, 1928   3 Sheets-Sheet 2

INVENTORS
Eugene Kower
William L. Cummings
BY
ATTORNEYS

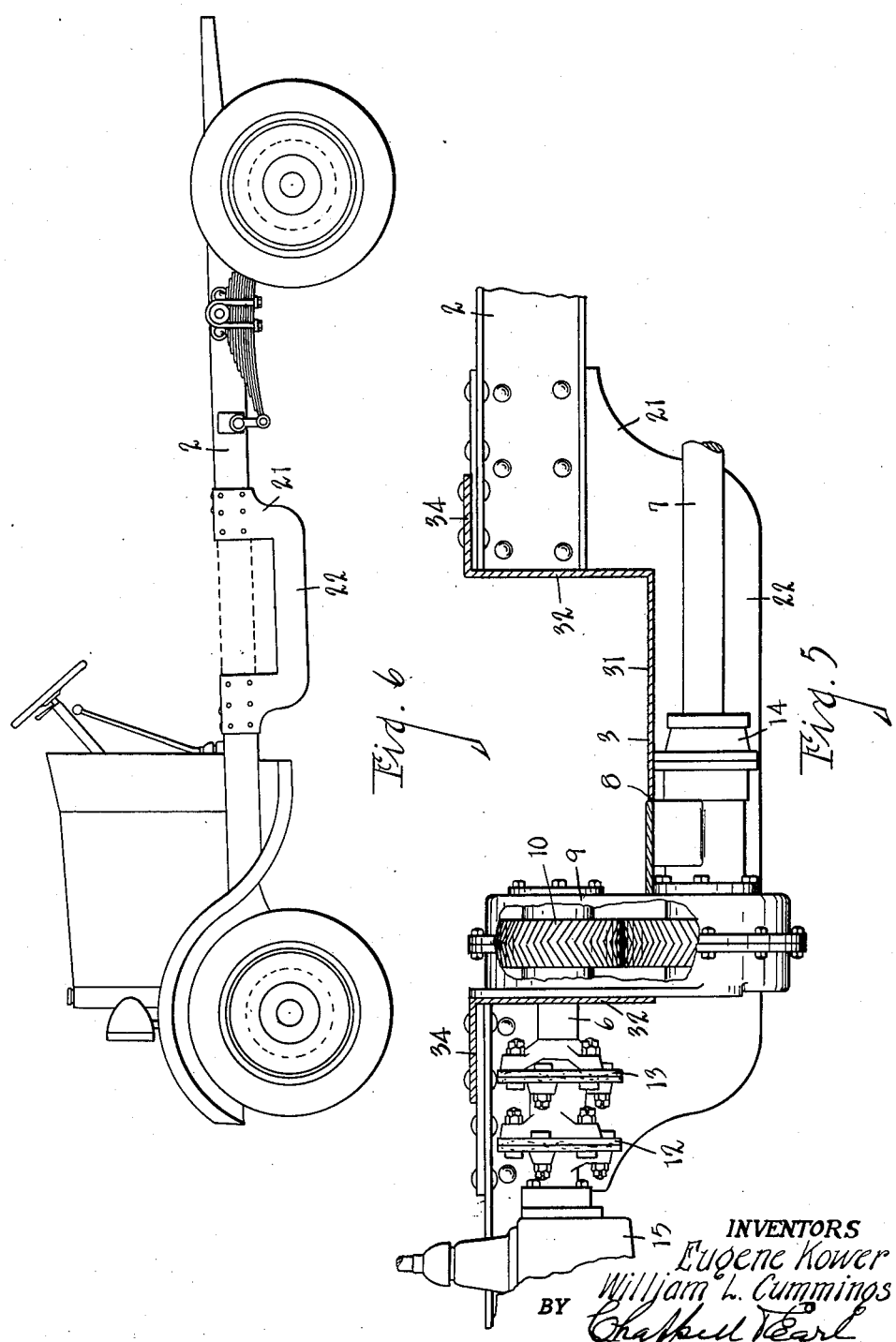

Patented Mar. 1, 1932

1,847,114

UNITED STATES PATENT OFFICE

EUGENE KOWER AND WILLIAM L. CUMMINGS, OF SAN FRANCISCO, CALIFORNIA

AUTOMOBILE AUXILIARY CONTROL STRUCTURE

Continuation of application Serial No. 305,363, filed September 12, 1928. This application filed May 15, 1930. Serial No. 452,574.

This application for patent is a continuation of our former patent application, Ser. No. 305,363, filed September 12, 1928, the first six claims here presented being identical with the claims of that application, and the additional claims relating to details of the structure which have been developed and which are more clearly illustrated in the present application.

The main objects of the invention are:

First, to provide a drop frame body structure and adaptation of mechanism whereby the vehicle can be operated by the operator when standing and at the same time leave conventional control intact for normal operation while in sitting position.

Second, to provide means for lowering the drive mechanism so as to clear beneath the floor of a drop frame vehicle body.

Third, to provide an operating means for the vehicle whereby the operation of the brake lever in the first portion of its movement actuates the clutch and later applies the brake.

Objects pertaining to details and economies of construction and operation will appear from the detailed description to follow. A structure which is a preferred embodiment of our invention is illustrated in the accompanying drawings, in which:

Fig. 1 is a conventional side elevation of our improved drop frame body embodying our special features as applied to a conventional truck, dotted lines more clearly illustrating certain operating parts.

Fig. 2 is a sectional plan view of the structure appearing in Fig. 1 taken on section line 2—2.

Fig. 5 is an enlarged detail sectional view on line 5—5 of Fig. 2 with a portion of the gear housing broken away showing details of the power coupling and the drop means therefor.

Fig. 6 is an enlarged detail side elevation view of the truck chassis showing the method of procedure in installing our improved auxiliary control structure.

Figures 3, 4:
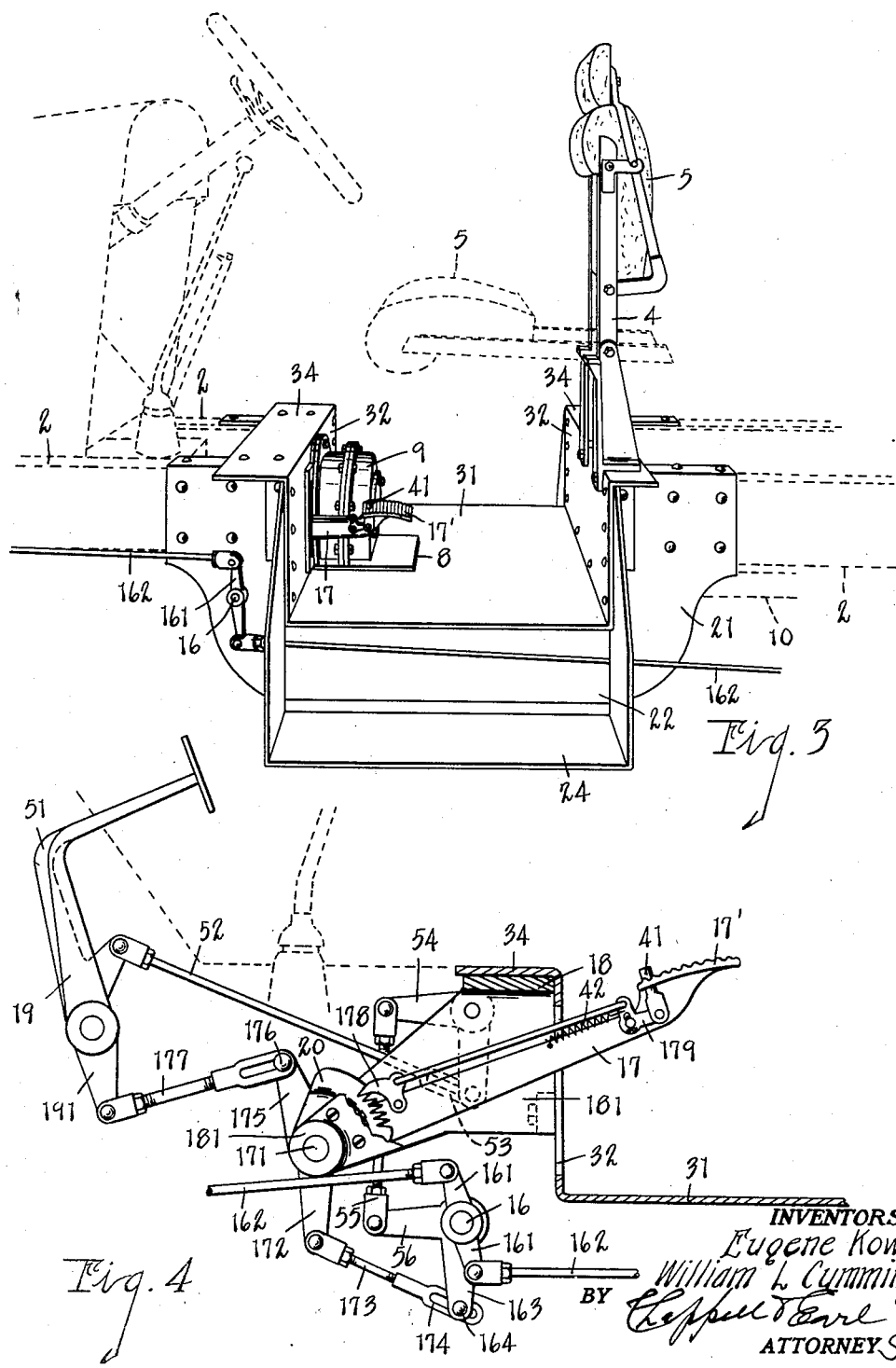
Figure 3 is an enlarged detail perspective of the parts appearing in Fig. 1; the vehicle body being removed and the steering wheel and emergency brake and control lever being indicated by dotted lines.
Fig. 4 is an enlarged detail sectional view on line 4—4 of Fig. 2, showing the disposition and arrangement of the auxiliary control pedal or lever.

The parts will be identified by their numerals of reference which are the same in all the views.

1 is an automobile truck body of the conventional type. 2 is the frame comprising side rails provided with drop sections 21 which are formed of a pair of integral sections with a central drop portion 22 for each side rail of the frame. These are secured in place by riveting to the frame and a central section of each side rail is cut out, as indicated by dotted lines in Fig. 6. There is interposed the drop floor section made up of a continuous sheet of metal 3 forming a drop floor section 31 with front and rear side walls 32 and with extended right angle flanges 34, 34 front and rear, all integral, which are secured to the frame sides.

This drop floor forms a clear cross passageway accessible from the ground, being about the height of the running board. We preferably provide an additional step 24 at each end of the run way that drops five or six inches below the level of the drop floor and the running board for very convenient accessibility to the vehicle.

4 is a standard at the back side of this run way carrying a hinged seat 5 which can be swung up out of the way or dropped down for use to the position indicated by dotted lines in Figs. 1 and 3.

This auxiliary structure is cut into and interposed in a regular truck construction usually of the well-known Ford design. The steering column, brake and clutch pedals, control lever and emergency brake are not in any way disturbed, but are left in their regular positions for use.

The propeller shaft 6 is divided at a point where it projects into the cross passageway and the rear portion 7 thereof is dropped down below the drop floor, as clearly seen in Figs. 1 and 5. A hole 8 is cut in the floor 31 and in the same is interposed the gear housing 9 in which a train of gears 10, or a chain drive means (not shown), is supported to connect the front section 6 of the propeller shaft to the rear section 7. The rear section 7 is below the drop floor and is connected to the usual worm gear 11 or other drive means for driving the rear axle.

The usual universal joints are provided in the propeller shaft, flexible joints at 12, 13 in the front section, and joint 14 in the rear section 7, or as engineering practice may require.

By this means a very effective connection is provided from the regular transmission gear 15 to the rear axle. This transmission and its operating levers are not altered in any way.

We provide an auxiliary control for the brake and clutch centrally disposed just above the floor in the said cross passage. The regular brake rockshaft 16 with its rocker arms 161 and brake rod connections 162 is lowered slightly for better clearance, but no way changed.

We provide an auxiliary brake and clutch pedal 17 which is carried by bracket 18 secured in front of the said drop section. This has two forwardly projecting bracket arms 181 which carry the fulcrum shaft 171 for the said lever 17. The lever 17 has a downwardly projecting arm 172 which is provided with link connection 173 to rockshaft arm 163 carried by the cross brake shaft 16. The connection 173 is provided with a slotted yoke 174 which plays on pin 164 on the arm 163.

This permits movement of the brake rockshaft 16 independent of the arm 172 and lever 17. Lever 171 is provided with upwardly projecting actuating arm 175 provided with cross pin 176 which is connected by rod 177 to arm 191 which is an extension of the normal clutch lever 19. The lever 17 is illustrated in the up position in Fig. 4.

It will thus be seen that when lever 17 is pushed down it will first operate the clutch lever 19, releasing the clutch, when a continued movement causes the slotted yoke 174 to act upon the pin 164 and operate the arm 163 and the brake shaft 16, and apply the brakes immediately after the clutch is released.

It is thus possible to control the application of a brake by the single auxiliary pedal lever 17, because it releases the clutch in advance of applying the brake.

A ratchet segment 20 is secured to the bracket arm 181. A cooperating ratchet pawl 178 is pivoted on the lever 17 and is controlled by the lever connection 179 provided with the push connection 41 which extends through an aperture in and above the pedal on the pedal lever 17. Return spring 42 is provided to keep the pawl in engagement with the ratchet segment.

The ratchet sector 20 is fixed to bracket arm 181 so that the first part of sector arc which is blank will carry the pawl 178 at tooth height during the clutch operating travel of the pedal 17, and that on passing through this distance will allow engagement of the pawl 178 in ratchet teeth, depending on the position the operator has his foot on the pad of lever 17. Push connection 41 is located off the center of the pedal pad and so it is possible to operate the lever with the foot on connection 41 and keep the pawl from engaging as in temporary slowing of the truck. Or, he may place his foot on the pad beside the connection 41, allowing the pawl to automatically engage the ratchet and hold any braking position he requires. This design and placement of the ratchet sector prohibits the operator from ratcheting the lever in the clutch range of action.

The brake lever 51 is provided with a link connection 52 having a slotted yoke 53 connecting to bell-crank 54 which is provided with a link 55 connecting to arm 56 on the brake shaft 16, so that the brake may be applied by the regular brake connection.

This connection might be made direct to an arm on the brake shaft 16, but it is found to be a little more convenient to connect through the bell-crank connection indicated.

From the description given it will be seen that the operator of this delivery truck can step into the clear cross passageway from either side, and by releasing the control lever 17, which he can do by stepping on the button 41, he can steer the truck, run it ahead to the next delivery point and then merely step on the pedal 17' which will first, by actuating the arm 175 through connection 177, operate the clutch lever and throw out the clutch. While this initial action is taking place, the arm 172 will be operated, acting on the link 173 and the slotted yoke 174 which will, after the clutch is out, act upon the pin 164 and apply the brake. The ratchet pawl 178 will engage the segment 20 and lock the lever down so that he can at once make a delivery out of either side of the vehicle.

After the delivery work is done, or on the way to the delivery, the operator can sit on the seat and operate the vehicle controls in the usual way, the connections from the clutch pedal and brake pedal being slotted to permit the operation independently of the auxiliary means provided.

We desire to state that we wish to claim the invention in the specific form illustrated and also broadly as pointed out in the appended claims.

Having thus described our invention, what we claim as new and desire to secure by Letters Patent is:

1. In an automobile drop frame auxiliary control structure, in addition to the usual controls, the combination of a drop frame with floor, a reduction gear train extending to a point beneath the drop floor, propeller shaft connection therefrom to the rear axle drive, an auxiliary foot pedal connection in said drop section, a slotted link connection to the main clutch pedal, connections from said auxiliary pedal to the brake timed to apply the brake after the clutch opens, a ratchet lock for said pedal to lock the brake when the clutch is released, and a trip for said ratchet pawl in proximity to the foot piece of said auxiliary pedal.

2. In an automobile drop frame auxiliary control structure, in addition to the usual controls, the combination of a drop frame with floor, a gear train extending to a point beneath the drop floor, propeller shaft connection therefrom to the rear axle drive, an auxiliary foot pedal connection in said drop section, a lost motion connection to the main clutch pedal, connections from said auxiliary pedal to the brake timed to apply the brake after the clutch opens, a ratchet lock for said pedal to lock the brake when the clutch is released, and a trip for said ratchet in proximity to the foot piece of said auxiliary pedal.

3. In an automobile drop frame auxiliary control structure, in addition to the usual controls, the combination of a drop frame with floor, a gear train extending to a point beneath the drop floor, propeller shaft connection therefrom to the rear axle drive, an auxiliary foot pedal connection in said drop section, a lost motion connection to the main clutch pedal, connections from said auxiliary pedal to the brake timed to apply the brake after the clutch opens, and a ratchet lock for said pedal to lock the brake when the clutch is released.

4. In an automobile drop frame auxiliary control structure, in addition to the usual controls, the combination of a drop frame with floor, a gear train extending to a point beneath the drop floor, propeller shaft connection therefrom to the rear axle drive, an auxiliary foot pedal connection in said drop section, a lost motion connection to the main clutch pedal, connections from said auxiliary pedal to the brake timed to apply the brake after the clutch opens, and a lock for said pedal to lock the brake when the clutch is released.

5. In an automobile drop frame auxiliary control structure, the combination with the side rails of the frame, of a drop side member for each frame side riveted to the severed frame sections with the portion of the frame within the drop removed, and a continuous plate metal drop floor section with front and rear walls and front and rear flanges disposed transversely upon and carried by the said frame connecting the sides together and stiffening the same.

6. The combination in an automobile having a drop frame structure forming a clear cross passage, of an auxiliary pedal lever projecting within the passage and provided with a connection to the clutch pedal and a lost motion connection to the brake pedal, a ratchet control segment disposed in proximity to the said auxiliary lever, a ratchet pawl carried by the auxiliary lever to engage the segment, a lever carried by the said auxiliary pedal with upwardly projecting control plunger therethrough for controlling the said pawl to release the lever by the action of the foot to facilitate the manipulation thereof to lock and release said auxiliary lever, and a trip means for said pawl in proximity to said auxiliary pedal.

7. The combination in an automobile structure of an auxiliary pedal lever provided with a connection to the clutch pedal and a lost motion connection to the brake pedal, a ratchet control segment disposed in proximity to the said auxiliary lever, a ratchet pawl carried by the auxiliary lever to engage the segment, a lever carried by the said auxiliary pedal with upwardly projecting control plunger therethrough for controlling the said pawl to release the lever by the action of the foot to facilitate the manipulation thereof to lock and release said auxiliary lever, and a trip means for said pawl in proximity to said auxiliary pedal.

8. The combination in an automobile structure of an auxiliary foot pedal lever provided with a connection to the regular clutch pedal and a lost motion connection to the regular brake pedal, a ratchet control segment disposed in proximity to the said auxiliary foot pedal lever, a ratchet pawl carried by the auxiliary lever to engage the segment, and a trip means for said pawl in proximity to said auxiliary foot pedal to enable its actuation by the foot.

9. In an automobile drop frame auxiliary control structure, in addition to the usual controls, the combination of a drop frame with floor, a gear train extending to a point beneath the drop floor, propeller shaft connection therefrom to the rear axle drive, an auxiliary foot pedal connection in said drop section, a lost motion connection to the main clutch pedal, connections from said auxiliary pedal to the brake timed to apply the brake after the clutch opens, and releasable lock means associated with said auxiliary foot pedal.

10. In an automobile drop frame auxiliary control structure, in addition to the usual controls, the combination of a drop frame with floor, a gear train extending to a point beneath the drop floor, propeller shaft connection therefrom to the rear axle drive, an auxiliary foot pedal connection in said drop section, a lost motion connection to the main clutch pedal, connections from said auxiliary pedal to the brake timed to apply the brake after the clutch opens, releasable lock means associated with said auxiliary foot pedal, and lost motion connection between auxiliary brake pedal and said brake mechanism to permit independent operation of the brake means and the auxiliary.

11. The combination in an automobile structure of an auxiliary pedal lever provided with a connection to the regular clutch pedal and a lost motion connection to the regular brake pedal, and a ratchet lock means for said auxiliary pedal and a release for said lock in proximity to the said pedal to enable its actuation by the foot.

In witness whereof we have hereunto set our hands.

EUGENE KOWER.
WILLIAM L. CUMMINGS.